United States Patent [19]

Apetrei et al.

[11] Patent Number: 4,496,864
[45] Date of Patent: Jan. 29, 1985

[54] BRAKE MOTOR

[75] Inventors: Constantin Apetrei; Victor Nitigus; Demeter Elek; Marian Radulescu; Toma Sachelaire, all of Bucuresti, Romania

[73] Assignee: Research Institute for the Electrotechnical Industry—ICPE, Bucharest, Romania

[21] Appl. No.: 600,590

[22] PCT Filed: Aug. 4, 1981

[86] PCT No.: PCT/RO81/00004
§ 371 Date: Jul. 30, 1982
§ 102(e) Date: Jul. 30, 1982

[87] PCT Pub. No.: WO82/01965
PCT Pub. Date: Jun. 10, 1982

Related U.S. Application Data

[63] Continuation of Ser. No. 406,232, Jul. 30, 1982, abandoned.

[30] Foreign Application Priority Data

Dec. 2, 1980 [RO] Romania ............................... 102742

[51] Int. Cl.³ ............................................. H02K 7/102
[52] U.S. Cl. ........................................ 310/77; 310/211
[58] Field of Search .................................... 310/76-78

[56] References Cited

U.S. PATENT DOCUMENTS

| | | | |
|---|---|---|---|
| 2,520,204 | 8/1950 | Hancock | 310/77 UX |
| 2,536,491 | 1/1951 | Chapman et al. | 310/77 |
| 3,407,319 | 10/1968 | Arraiza | 310/77 |
| 3,502,918 | 3/1970 | Done et al. | 310/77 |
| 3,562,565 | 2/1971 | Higashino et al. | 310/77 |
| 3,683,217 | 8/1972 | Hgalakov et al. | 310/77 |
| 4,096,404 | 6/1978 | Sukhanov et al. | 310/77 X |
| 4,129,797 | 12/1978 | Lindner | 310/77 |

FOREIGN PATENT DOCUMENTS 1563930 of 0000 France .
2133197 of 0000 France .
996356 of 0000 United Kingdom .

Primary Examiner—Donovan F. Duggan
Attorney, Agent, or Firm—Karl F. Ross

[57] ABSTRACT

The invention refers to a brake electrical asynchronous motor with short-circuited rotor and double drive, where its magnetic field simultaneously generates both the revolving torque on the rotor, and the electromagnetical force for deblocking the brake.

The motor, according to the invention, is characterized by a constructive system with a normal stack of statoric sheets, elongated by a supplementary stack of statoric sheets, having the same cross-geometry as the normal stack of statoric sheets, with an excitation winding common to both, a normal stack of rotoric sheets with the cage rods elongated into the area from under the supplementary stack of statoric sheets, and separated by stacks of teeth between which are created slots with the same shape with those in the area of the normal stack of statoric sheets, but opened towards the inside and short-circuited through these openings by the short-circuiting ring, located in this area.

When power supplied at the statoric winding, between the front surface of the stacks of teeth that separate the rotoric cage rods in the area from under the supplementary stack of statoric sheets, and the adjacent front surface of the brake deblocking movable armature an axial attraction electromagnetic zone appears, being generated by the summed action of the magnetic field created by the current flowing through the short-circuiting ring, and of the magnetic field created by the statoric excitation winding in the area of the supplementary stack of statoric sheets, force that nullifies the pressure between the friction faces given by the pressure spring and the braking torque, disappears.

3 Claims, 2 Drawing Figures

BRAKE MOTOR

This application is a continuation of application Ser. No. 406,232 filed July 30, 1982, now abandoned.

CROSS REFERENCE TO RELATED APPLICATION

This application is a national phase application corresponding to PCT R081/00004 filed Aug. 4, 1981 and based in turn upon a Romanian application 102,742 filed Dec. 2, 1980 under the International Convention.

FIELD OF THE INVENTION

The invention relates to a brake asynchronous electrical motor, with double drive and short-circuit rotor, where its own magneticfield, simultaneously generates both the rotational torque on the rotor, and the brake deblocking electromagnetic force.

BACKGROUND OF THE INVENTION

A motor is known where, to use part of the magnetic field created by the stator excitation winding, to generate the axial attraction force on the brake deblocking movable armature, the stack of stator sheet proper is elongated by a supplementary stack of stator sheets, with the same number of slots as the stack of stator sheets proper, and the teeth of the slots are elongated towards the central area, up to the level of the rotor short-circuiting ring inner diameter, and are separated from the corresponding slots. This shape of the supplementary stack of stator sheets has the disadvantage of encumbering the manufacturing of the stator and impedes attempts to automatically wire it.

SUMMARY OF THE INVENTION

The present invention removes this disadvantage by the use of a normal stack of stator sheets, extended by a supplementary stack of stator sheets, having the same cross-geometry as the normal stack of stator sheets, the excitation winding being common to both, a normal stack of rotor sheets having the cage rods, extended in the zone within the supplementary stack of stator sheets and separated by stacks of teeth, between which appear slots with the same shape as those in the area of the normal stack of rotor sheets, but open towards the inside, and short-circuited though these openings by the short-circuiting ring, located in this area, the stacks of teeth being magnetically separated from the area of the normal stack of rotor sheets by means of a spacer. In front of the stacks of teeth we provide the brake deblocking movable armature that may move axially on the shaft, the shaft constituting, in the corresponding area, a part of the magnetic circuit for closing the magnetic flux created by the current that flows through the short-circuiting ring. The magnetic flux is summed in the air gap between the brake deblocking movable armature and the stacks of teeth, with the magnetic flux created by the excitation winding in the supplementary stack of stator sheets. The summed magnetic flux generates the axial attraction electromagnetic force that acts upon the brake deblocking movable armature. The brake deblocking movable armature active zone, in front of the stacks of teeth, may be made by rolling out of electrotechnical plate, to enable the penetration of the magnetic field and to decrease losses by eddy currents in transitory regime, or steel. The brake deblocking movable armature is fixed on the shaft either with a sliding fit, or by a corresponding ball or pin bearing, that allows axial displacement, the axial attraction electromagnetic force acting on the brake deblocking movable armature passes to one of the friction parts, that plays the part of the ventilator as well, by means of a screw, a rod located in a central hole of the shaft, adjusting nuts and a notched sleeve.

SPECIFIC DESCRIPTION

The motor, according to the invention requires a magnetic field to generate both the rotating torque on the rotor, and the electric magnetic force for brake deblocking. In order to achieve this, the motor has, besides the normal stack of stator sheets, a supplementary stack of stator sheets, the excitation winding being common to both. The stack of stator sheets has its cage rods elongated into the area within the supplementary stack of stator sheets, separated by a stack of teeth, between which appear, slots with the same shape with those of the normal area of the stack of rotor sheets, but open internally and short-circuited though these openings by the short-circuiting ring located in this area, the stacks of teeth being magnetically separated from the normal area of the stack of rotor sheets.

The brake deblocking movable armature may be made completely out of steel and fixed on the motor shaft either by a sliding fit, or by a corresponding bearing.

Figure 1:
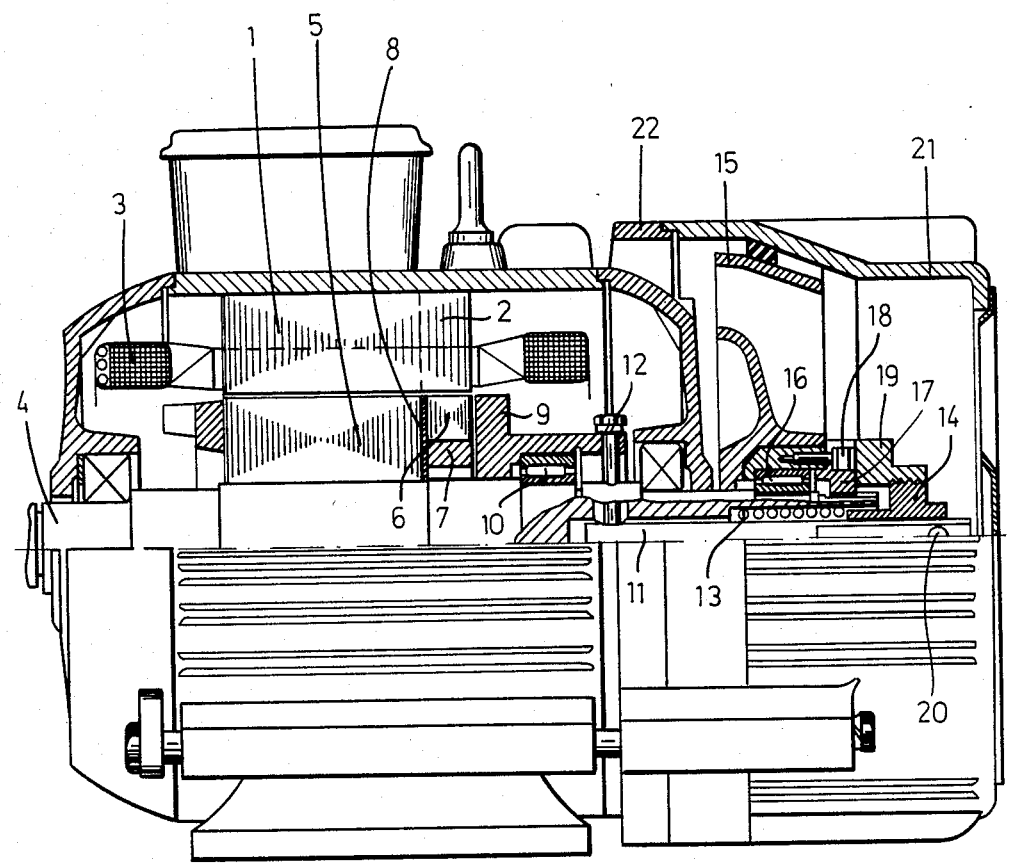
FIG. 1 is a longitudinal section of the motor assembly.
Figure 2:
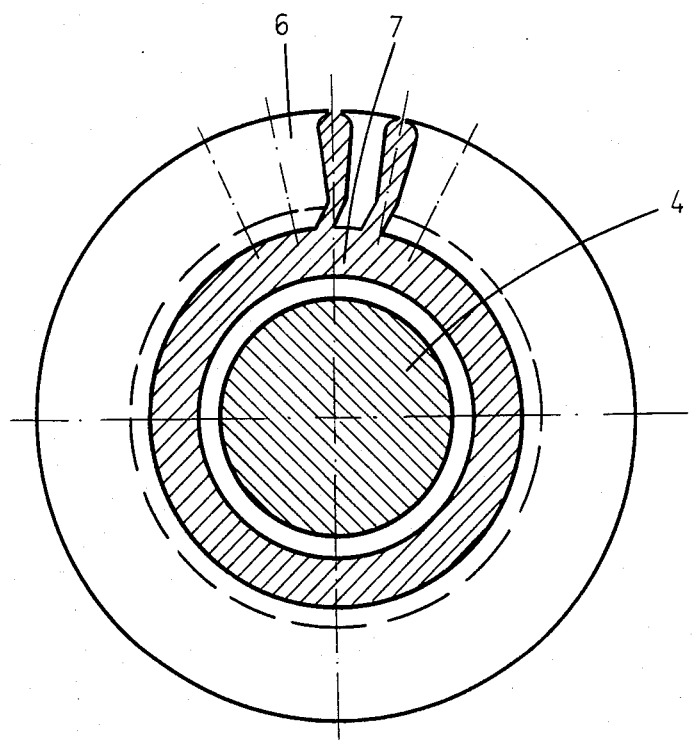
FIG. 2 is a cross section of the rotor area under the supplementary stack of stator sheets.

As can be seeen from FIG. 1, the motor has a conventional stator 1, elongated by a supplementary stack 2 of stator sheets, both having the same cross-geometry and the excitation winding being common to both of them.

On the motor shaft 4, there is a conventional stack 5 of rotor sheets that has its cage bars 6 elongated into the area under the supplementary stack 2 of stator sheets, separated by slots with the same shape as those in the armature stack 5 of rotor sheets, but open inwardly. The bars 6 are short-circuited by the short-circuiting ring 7 located in this area; the stacks forming bars 6 are magnetically separated from the usual stack 5 of rotor sheets by the spacer or magnetic separator 8.

The brake deblocking movable armature 9 is fixed on the shaft 4 by means of a pin bearing 10, that gives it the possibility of axial displacement. Through a central hole in the shaft 4, passes a rod 11, interlocked with the brake deblocking movable armature by means of the screw 12, that passes radially through the shaft 4, through an axially elongated (oval) hole.

The pressure spring 13, that ensures the braking force, is located around the rod 11 and is sustained at one end by a corresponding shoulder of the central hole in the shaft 4, while the other end presses against the shoulder of the adjusting nut 14.

Ventilator 15 forms one of the friction parts of the brake and is fixed on the shaft 4 by means of the pin bearing 16 that gives it the possibility of axial displacement, ensuring, at the same time, a good centering. The rotary torque, or the braking torque, is transmitted from the shaft 4 to ventilator 15 and vice-versa by means of the notched sleeve 17 fixed on the ventilator 15 with the screws 18.

The axial displacement of the rod 11, under the action of the braking axial electromagnetic force active on the brake deblocking movable armature 9 against the action of the braking force given by the pressure spring 13 is transmitted to the ventilator 15 by means of the adjusting-screw nut 19, on which it is axially fixed by means of screws.

The adjusting nut 14 is blocked on the rod 11 by means of the split pin 20 that passes the rod 11 through a radial hole.

The cover 21 is the other friction part of the brake, and is fixed on the shield 22 by a corresponding fit and screws.

When the stator winding 3 is not supplied with electrical energy, the pressure spring 13 presses the ventilator 15 against the cover 21 at the friction surfaces. Between the friction surfaces, that may be conical as shown, or flat, the braking force blocking the shaft 4 is produced.

When the stator winding 3 is supplied with electrical power, the magnetic field created by the current that flows through the short-circuiting ring 7, combined with the magnetic field created by the stator winding 3 in the area of the supplementary stack of stator sheets 2, acts with an axial attraction force on the brake deblocking movable armature 9 to compress the pressure spring 13, spacing the ventilator 15 from the cover 21, thereby removing the braking force.

To adjust the braking force, one need only take off the pin 20 and rotate the nut 14, screwing it on the rod 11, generating a variation in the force given by the pressure spring 13.

The effect of the friction materials wear is corrected by means of the nut 19.

The motor, according to the invention, has the advantage of maintaining classical technology in manufacture of the stator.

We claim:

1. An induction motor with automatic braking upon deenergization comprising:
    a motor housing;
    a shaft journaled in said housing for rotation about an axis;
    a stator formed in said housing surrounding said shaft and comprising a stack of normal stator sheets and a further stack of sheets axially extending said stator on one side thereof;
    a rotor carried by said shaft and comprising a stack of normal rotor sheets surrounding said shaft and surrounded by said stack of normal stator sheets, a magnetic separator at said side of said stack of normal rotor sheets, and a toothed extension of said rotor adjacent said magnetic separator and formed from a respective sheet stack with slots between the teeth within said extension of said stator;
    a short-circuiting ring wholly within the extension of said stator, surrounding said shaft and short-circuiting said teeth;
    a magnetic armature surrounding said shaft and axially shiftable thereon at said side and juxtaposed with said stack of sheets forming said teeth and with said short-circuiting ring, said armature extending axially away from said rotor, said shaft being provided with a bore and with a radial passage opening into said bore;
    a rod in said bore coupled with said armature at an end thereof remote from said rotor through said passage;
    a fan carried on said shaft and rotatably entrained thereby while being axially shiftable on said shaft;
    means adjustably connecting said fan to said rod for axial displacement thereby, said fan and said housing defining a brake which is disengaged by axial displacement of said fan, said rod and said armature by the application of a magnetic field to said armature;
    stator windings on said stator for mechanically energizing same to generate said magnetic field and a field rotating said rotor and said shaft; and
    a spring in said shaft acting upon said rod in a direction opposite the direction upon which said magnetic field acts thereon, said means adjustably connecting said rod to said fan including:
        a threaded member mounted on said shaft and connected thereto by a removable pin and forming a seat for said spring, and
        a threaded nut mounted on said thread member for screwing engagement therewith and connected to said fan.

2. The motor defined in claim 1 wherein said fan is provided with a notched ring angularly coupling said fan to said shaft.

3. The motor defined in claim 1 wherein said armature is mounted on said shaft and said fan is mounted on said shaft by respective pin bearings enabling axial displacement of said fan and said armature.

* * * * *